United States Patent [19]

Rodenberg et al.

[11] 4,294,195
[45] Oct. 13, 1981

[54] HOG FARROWING MODULE

[76] Inventors: Joseph H. Rodenberg, 8290 N. Kenwood, Indianapolis, Ind. 46260; Richard K. Gilcrest, 5613 Skyridge Dr., Indianapolis, Ind. 46250

[21] Appl. No.: 45,507

[22] Filed: Jun. 4, 1979

Related U.S. Application Data

[63] Continuation of Ser. No. 801,625, May 31, 1977, abandoned.

[51] Int. Cl.$^3$ ............................................... A01K 1/00
[52] U.S. Cl. ........................................ 119/20; 119/28
[58] Field of Search ...................... 119/16, 20, 28, 27

[56] References Cited

U.S. PATENT DOCUMENTS

| | | | |
|---|---|---|---|
| 2,602,419 | 7/1952 | Johnson | 119/16 |
| 3,019,763 | 2/1962 | Ferris | 119/14.03 |
| 3,028,097 | 4/1962 | Johnson | 119/20 X |
| 3,181,503 | 5/1965 | Tripp | 119/20 |
| 3,224,414 | 12/1965 | Conover | 119/28 |
| 3,225,737 | 12/1965 | Biehl | 119/16 |
| 3,429,297 | 2/1969 | Schroer | 119/17 |
| 3,584,603 | 6/1971 | Rutherford | 119/28 |
| 3,791,346 | 2/1974 | Willinger et al. | 119/17 |
| 3,905,334 | 9/1975 | Stevenson | 119/20 |

Primary Examiner—Hugh R. Chamblee
Attorney, Agent, or Firm—Henderson & Sturm

[57] ABSTRACT

A modular base that is readily connected to other such bases upon which commercially available livestock confinement or farrowing stalls can be set. The base rests upon screw jacks and each individual base can be tilted such that a desired slope can be maintained throughout interconnected units despite an uneven floor. The top of the base has an opening toward one end which is covered by a grate through which animal wastes pass to a trough. The troughs are interlocking allowing wastes to flow down the slope from base to base and eventually away to a collection point. A drain at the other end of the base under the stall's watering device, empties into the trough. The top has a crown profile and has heating elements embedded in it that are capable of being interconnected and controlled from a central point. Interconnection of the desired number of bases allows buildings designed for other uses to be converted into efficient confinement or farrowing systems without extensive remodeling. For buildings with pre-existing manure troughs, the modular bases can be placed over them and thereby confine the odors from the pre-existing troughs.

1 Claim, 9 Drawing Figures

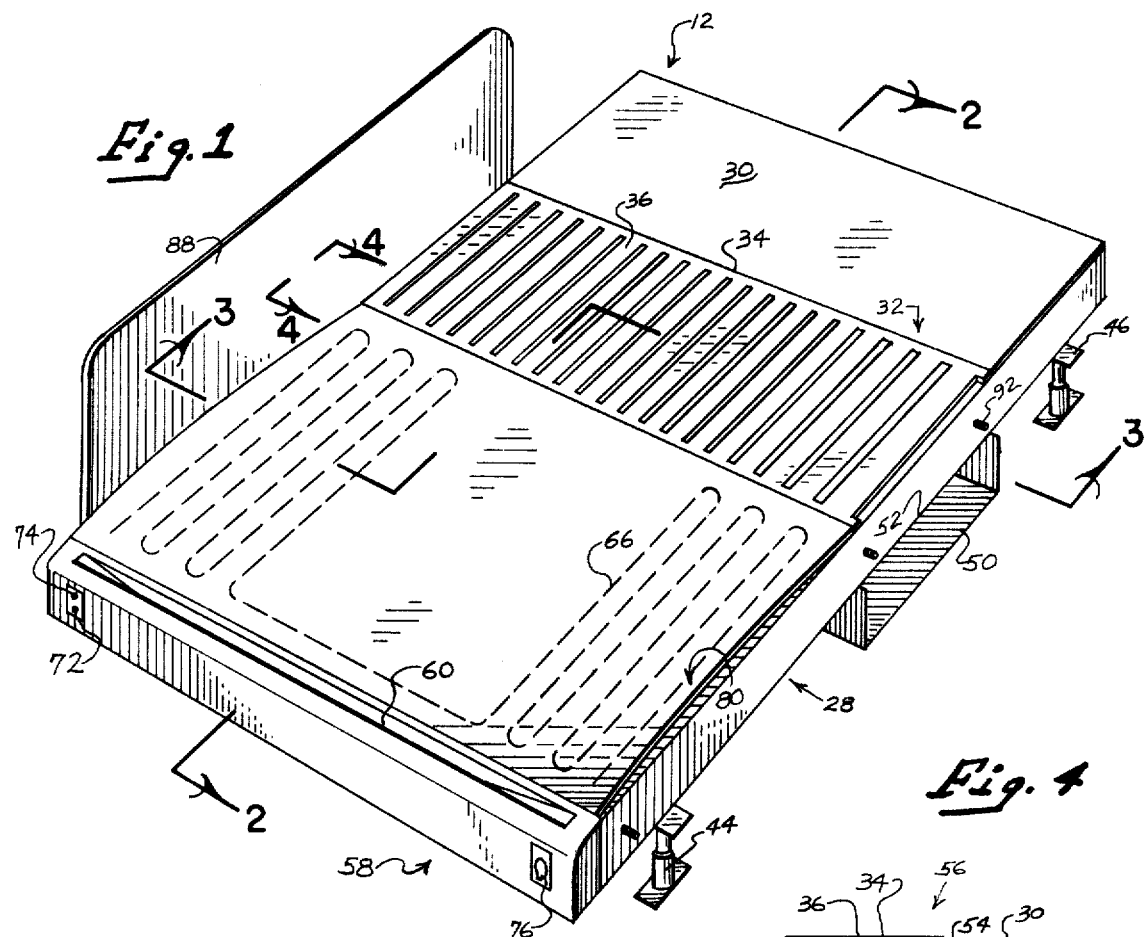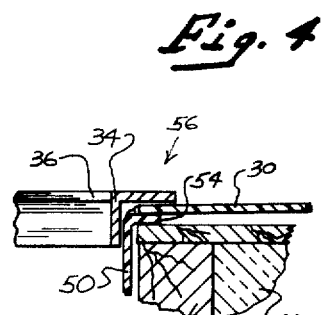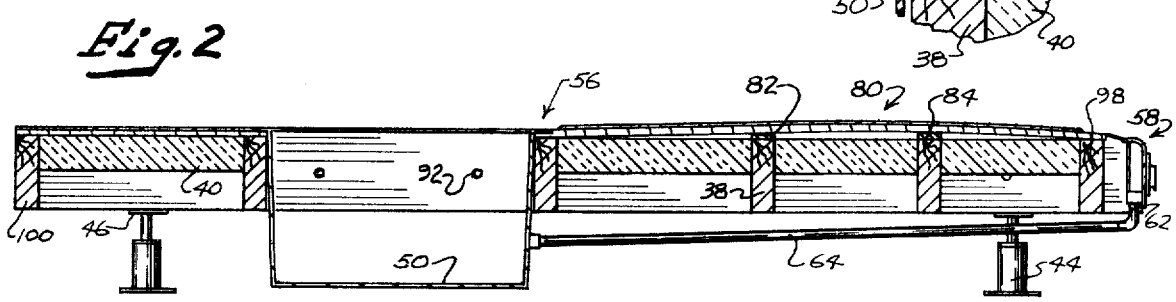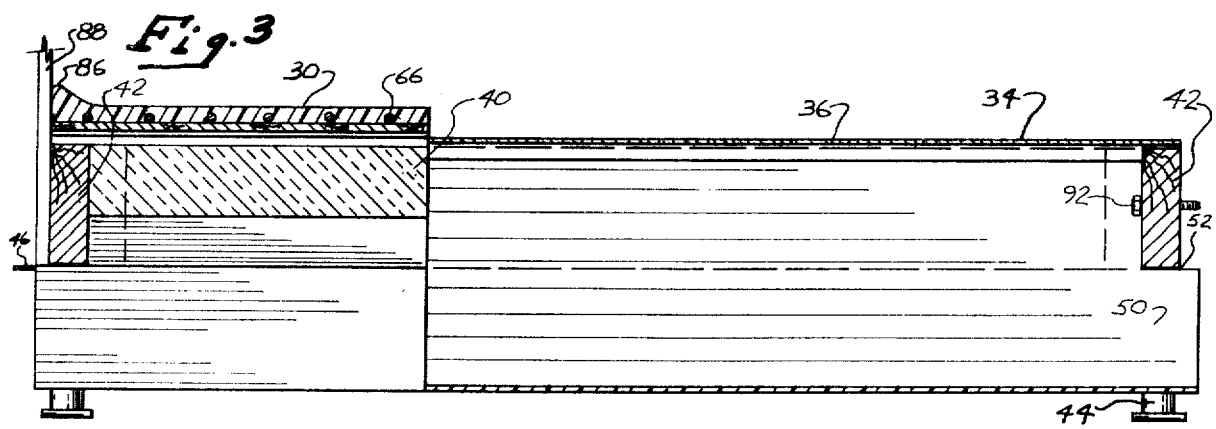

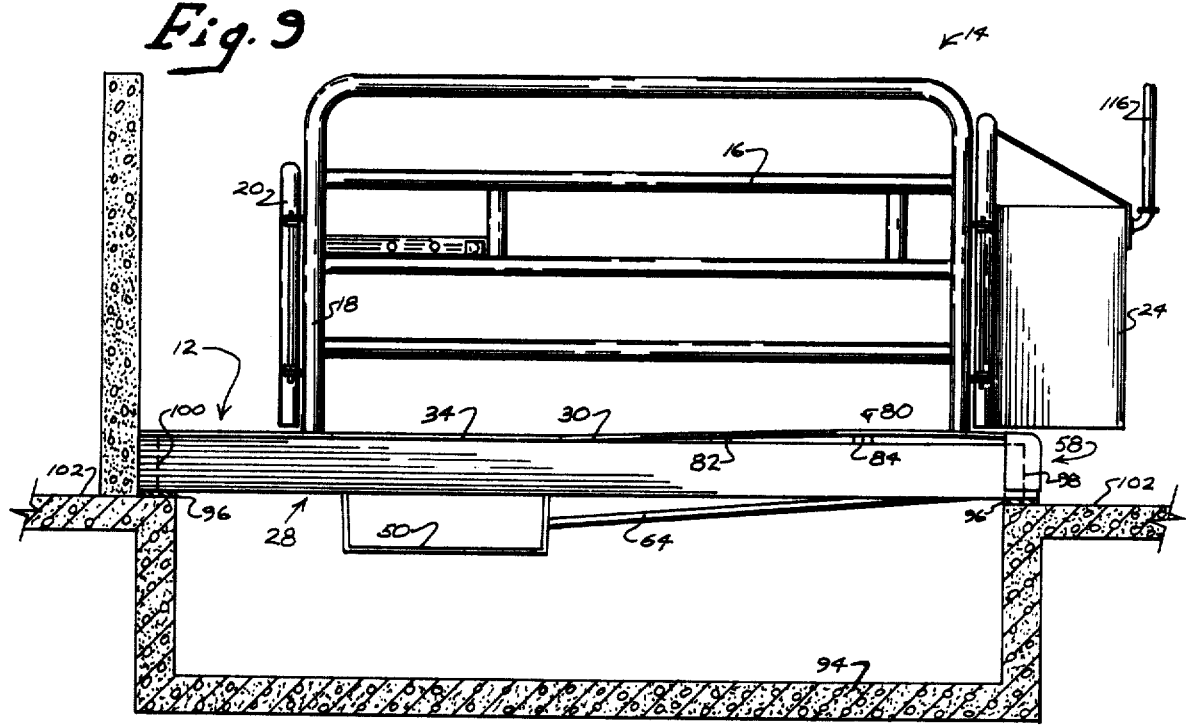

HOG FARROWING MODULE

This is a continuation of application Ser. No. 801,625 filed on May 31, 1977, now abandoned.

BACKGROUND OF THE INVENTION

This invention relates to modules for livestock confinement units and especially hog farrowing pens. It has been customary to provide special facilities for hogs that are farrowing to reduce newborn pigs losses due to exposure to undesirable climate conditions, unsanitary conditions resulting from fouling the nest with pig waste products, and the danger of the mother sow crushing the piglets if not separated from them. Previous structures to confine livestock have been custom built and are fixed in the number or amount of spaces provided. For example, either open front or closed confinement systems of present day construction are substantially pre-built at the factory.

Alternatively, structures specifically designed and built for livestock confinement or farrowing involved substantial amounts of on site labor and expensive machinery to control the environmental conditions. The finished structure can only be used for the intended use and most efficiently only with the intended number of animals. In addition, many of the present confinement areas have slippery floors whose surface abrades the knee of the animals. The floors are also flat, that hinders drainage of spills to any waste troughs. The factory built confinement systems are also large and heavy and thus require loading machinery and substantial labor during transportation to the site of use. Finally, some of the present livestock confinement area designs do not provide for easy loading of the animal head-first into the stall.

SUMMARY OF THE INVENTION

This invention relates to a module adapted to support a livestock confinement or farrowing stall. The stall has spaced parallel side frames, a rear frame with a swingable end gate, and a front frame constructed to retain feed and support a watering device. The module is comprised of a base with a floor, an opening, a grate over an opening in the floor, a trough under the grate, and a front drain. The floor is wider and larger than the stall. The opening in the floor is completely across the floor and toward one end of the floor. The grate over the opening is under the rear frame of the stall, but within the side frames. The trough under the grate is for receiving waste placed on the grate. The drain, under the front of the stall and under the watering device, is connected by a tube running under the floor to the trough, emptying into the trough.

It is the principle object of this invention to provide a module for various commercially available livestock confinement stalls or farrowing units which by its design allows varying numbers of modules to be interconnected, centrally controlled, and efficiently cleansed. This can be done in various buildings, some of which were designed for other purposes (such as machine storage, etc.), thus converting those buildings into efficient farrowing systems without extensive remodeling.

It is another object to provide a module for livestock confinement units which is adaptable to varying floor conditions in buildings both designed for unspecified use and for permanent livestock confinement or farrowing.

Yet another object of this invention is to provide a portable farrowing module with a waste trough under a grate that can be interconnected with waste troughs of innumerable other modules. The animal waste can then be allowed to trickle from unit to unit to a separate holding point, or all modules can be flushed simultaneously at the option of the operator.

Still another object of this invention is to provide a module where water is slopped by the livestock from a watering device at the front and is directed to the waste trough, thereby facilitating waste removal from the unit.

It is still a further object of the present invention to provide a floor profile incorporating a crown in the front half to provide for spillage draining to either the front or rear gutter areas. Piglets have been found to prefer and seek out the crown of this profile.

It is another object to provide a favorable climate for young livestock in their separate area of the base top by using heating means embedded in the floor to control the floor temperature.

Yet another object is to provide a means for interconnecting all the heating systems in the bases to a central control.

It is still another object of the present invention to provide a farrowing module adapted to fit over a pre-existing manure trough, and by use of a sealing means to prevent the escape of odors from the pre-existing trough and to control bacterial contamination from that trough. The module is sufficiently adaptable, however, to also utilize the pre-existing trough for waste removal by removal of the modules waste trough.

It is another object of this invention to provide by adjustable screw jacks attached to each module a slope along all interconnected modules that best facilitates waste removal, including by the trickle pit method.

Yet another object of this invention is to provide a floor that is non-slip and further that is smooth enough not to abrade the knees of the animals.

Yet another object of this invention is to provide a module that is small and light enough to allow two persons to load and transport it in a pick-up truck to the site of its use.

Yet another object of this invention is to provide for easy head-first loading of animals into the stall.

Yet another object of this invention is to allow quick disassembly of the interconnected modules and reuse of the individual modules at different locations with other interconnected modules.

Yet another object of this invention is to provide a module that can be interconnected and used in buildings designed for other purposes (such as machine storage, etc.). Because of the module's flexibility, these buildings can be converted into efficient livestock confinement or farrowing systems without extensive remodeling. After the use of the modules cease, the building can be used again for its original purpose.

Yet another object of this invention is to provide a floor with a lip on the side edges to reduce waste spillage from the modules.

Yet another object of this invention is to provide for interconnected modules to share support from one screw jack placed near the abutting side edges.

Yet another object of this invention is to provide for modules sharing a common wall at abutting side edges.

Still another object of this invention is the provision of a farrowing module having a floor with a non-slip surface but readily susceptible to cleansing by high pressure steam spray or the like with disenfectant for easily maintaining a sanitary floor surface.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of the module.

FIG. 2 is a vertical cross-sectional view taken along line 2—2 of FIG. 1.

FIG. 3 is a vertical cross-sectional view taken along line 3—3 of FIG. 1.

FIG. 4 is a detailed cross-sectional view of the joint between the floor and the waste trough.

FIG. 9 is a vertical cross-sectional view of a module with a farrowing stall attached placed over a pre-existing waste trough.

DESCRIPTION OF THE PREFERRED EMBODIMENT

Figure 5:
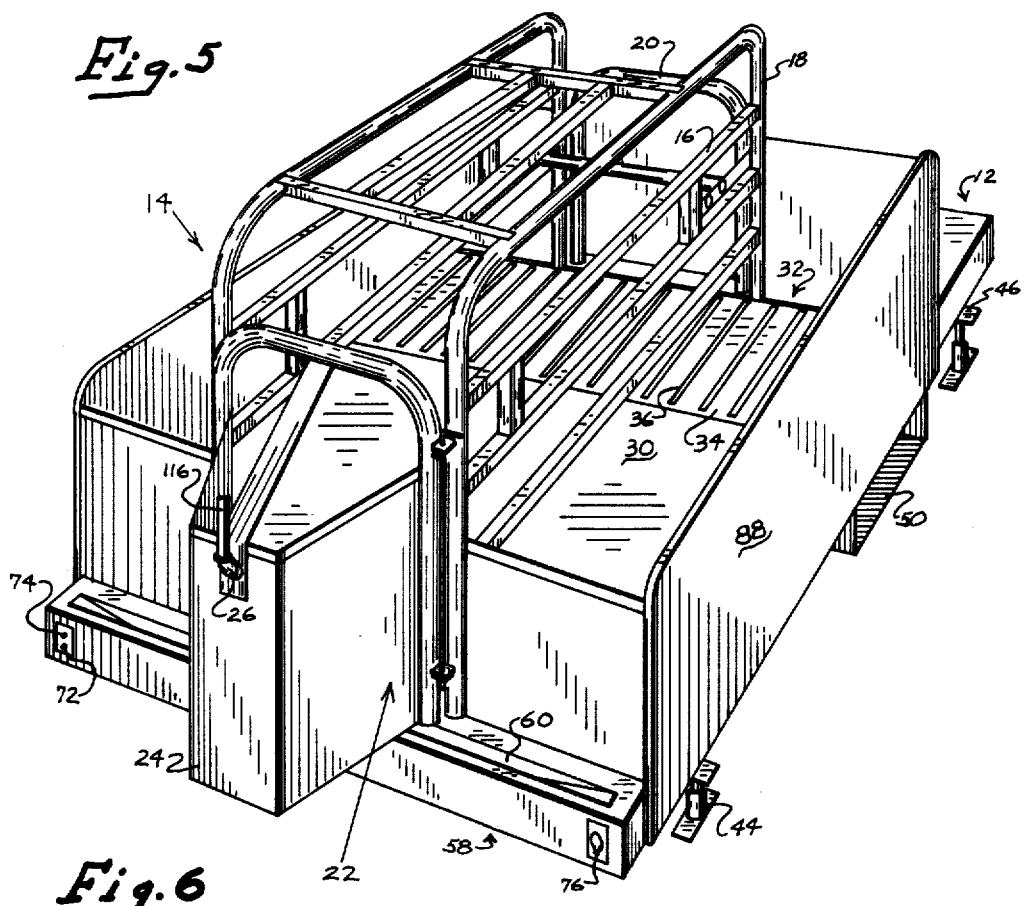
FIG. 5 is a perspective view of the module with a farrowing module attached.

Referring now to the drawings, and more particularly to FIG. 1-4, the present invention relates to a module 12 supporting a commercially available livestock confinement or farrowing stall 14 (FIG. 4). The stall 14 has spaced parallel side frames 16 and a rear frame 18 with a swingable end gate 20. At the front 22 of the stall 14 is mounted a feeder 24 and a watering device 26.

The module 12 (FIG. 1) has a base 28 which has a floor 30 wider and longer than the stall 14, and which floor 30 has a rectangular opening 32 formed therein toward the rear. The opening 32 extends the complete width of the floor. Completely covering the opening 32 is a rectangular grate 34 composed of a plurality of parallel slats 36. The slats 36 are spaced laterally and equidistantly throughout the width of the grate 34. The spacing is such that the feet of the livestock animals, most especially piglets, cannot get caught between the slats 36, but sufficient to permit waste to fall freely therebetween. Connected to the base 28 below the grate 34 for receiving waste is a trough 50 (FIGS. 1 and 2).

The trough 50 extends across the width of the base 28 and, on one side extends a short distance beyond the side edge 52 of the base 28. When modules 12 are interconnected as in FIGS. 6 and 7, the extension of the trough 50 beyond one side allows waste to flow from module 12 to module 12. The trough 50 is substantially rectangular and has flanges 54 (FIG. 4) at the top which are sealed into a joint 56 with the floor 30, when the floor 30 is made of fiberglass. The joint 56 is then impervious to animal waste and the insulation 40 and support members 38 are not contaminated. Underneath the floor 30 is the base 28 and a plurality of supporting members 38. Insulation 40 is secured below the floor 30 between the support members 38.

Figure 6:
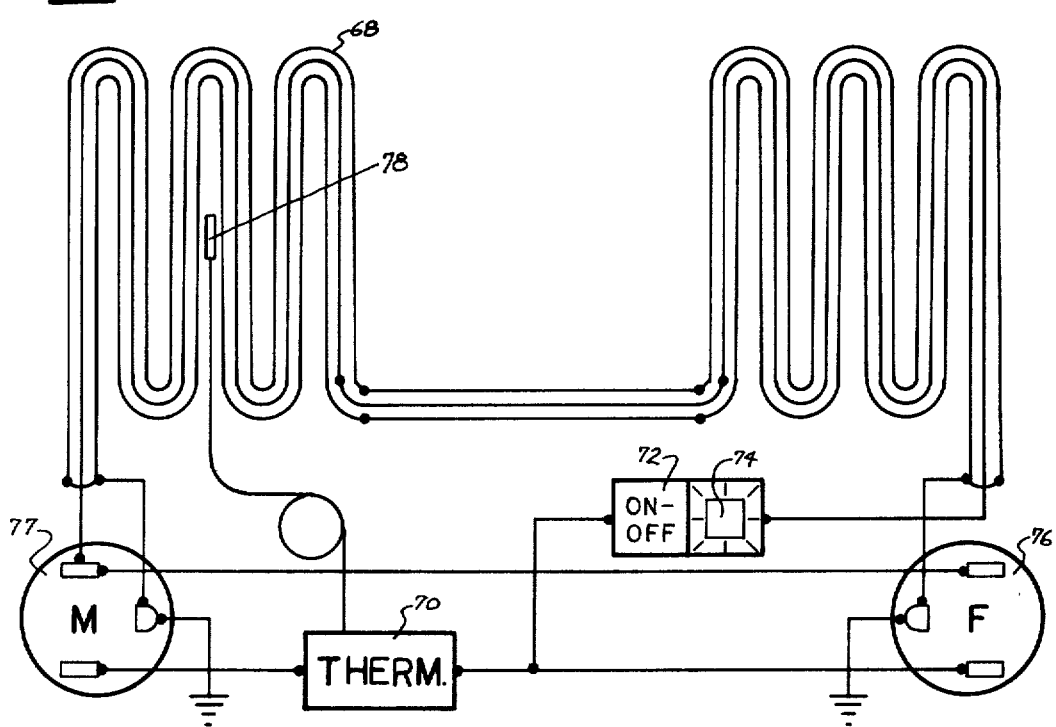
FIG. 6 is a circuit diagram of the heating element system.

Attached to the side support members 42 in rectangular arrangement are a plurality of screw jacks 44. Attached to the screw jacks 44 and side members 42 are support plates 46 that extend beyond the external side of the side support members 42. When modules are interconnected as in FIGS. 6 and 7, the support plates 46 allow the screw jacks 44 on one module 12 to support an adjacent module also. Thus the need for screw jacks 44 on both sides of all but the modules 12 on the ends of an interconnected row of modules 48 is eliminated. As shown in FIG. 6, the screw jacks 44 are adjustable. Each module 12 can then be tilted in such a way that a desired slope transversely across all the interconnected modules can be readily accomplished.

Embedded in the floor 30 are heating devices 66 for maintaining a desired floor temperature. In FIG. 5, the heating devices 66 are electric coils 68 shown in the circuit diagram. The electric coils 68 are controlled by a thermostat 70 and are controlled by a switch 72 that also contains an indicator light 74. The socket 76 and plug 77, the switch 72, the indicator light 74, and the thermostat 70 shown in FIG. 6 are placed in the front of the drain 58, as best illustrated in FIG. 4. Also embedded in the floor 30 is a temperature sensing device 78 that provides temperature readings to the thermostat 70. The floor 30 has a non-slip surface as provided by the particular texture of the fiberglass.

As seen in a side elevation in FIG. 2, the floor has a crown profile 80. The crown 80 is formed toward the front 22 of the stall 14 and extends laterally throughout the entire width of the floor 30. The crown 80 is brought about by placing a small furring strip 82 and a larger furring strip 84 across the longitudinal support members 38 as shown in FIG. 2. The crown 80 helps waste spillage move to either the waste trough 50 or the front drain 58. The floor 30 also has a lip 86 on each side edge that confines waste spillage and prevents it from getting between interconnected modules 48.

The interconnected modules 48 also share a common side panel 88 as shown in FIG. 6. The modules 12 are attached to one another by bolts 90 and nuts 92. This way of attaching modules 12 to one another allows for quick assembly and disassembly.

Figure 8:
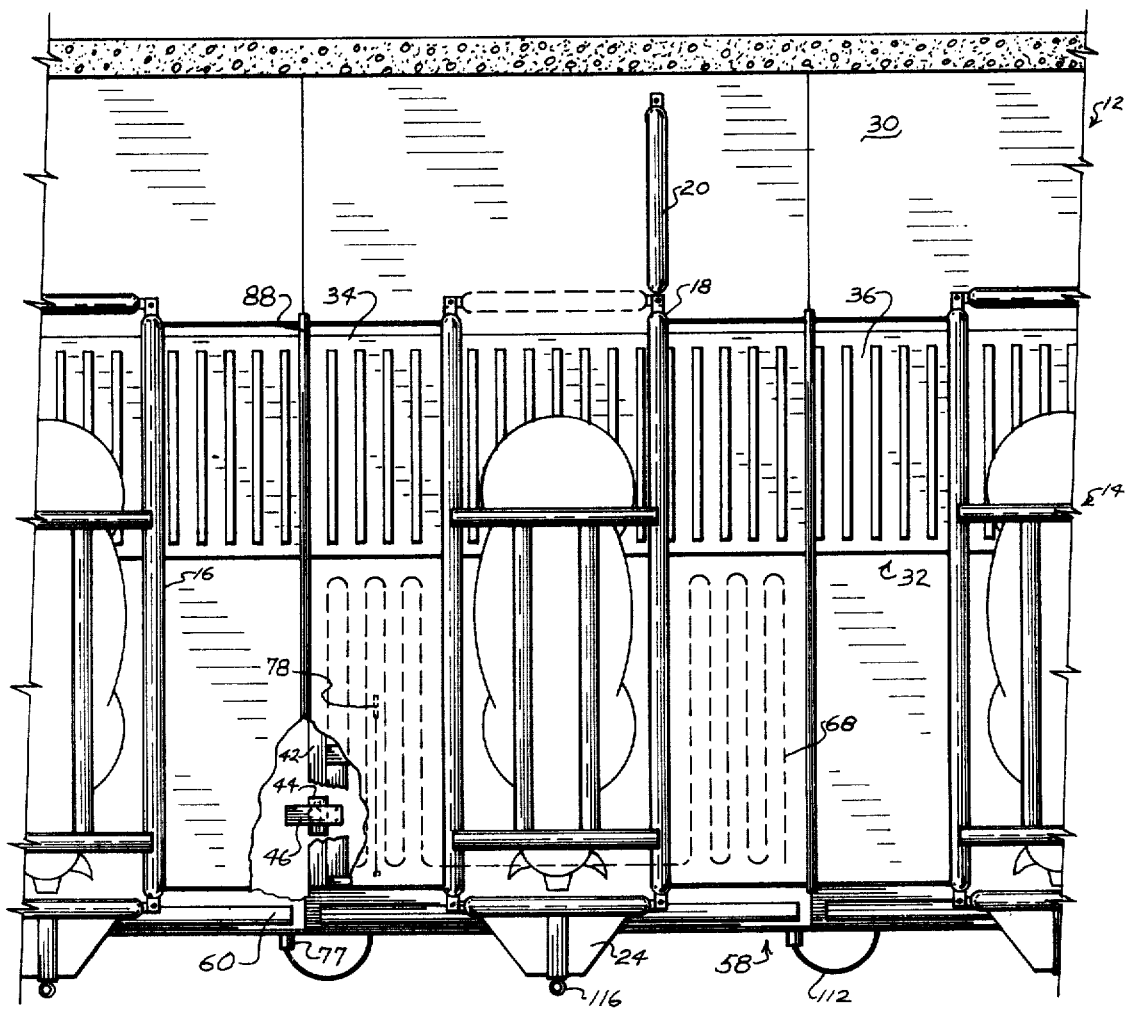
FIG. 8 is a top plan view of several interconnected modules.

As shown in FIG. 8, the modules can also be used in buildings with pre-existing waste troughs 94. The sealing devices 96 are attached to the front bottom edge of the front support member 98 and the rear bottom edge of the rear support member 100. The sealing devices 96 rest upon the top edges 102 of the pre-existing waste trough 94 when the modules 12 are placed in a building with a pre-existing waste trough 94. In that way, the escape of odors from the pre-existing waste trough 94 is restricted.

Attached to the front of the base 28 is a drain 58 that is under the front of the stall 22 and watering device 26. The drain 58 is a gutter 60 that extends throughout most, but not all, of the width of the base 28. The gutter 60 slopes downwardly to a central opening 62 in the rear wall of the gutter 60. Connected to the central opening 62 is a tube 64 that runs under the floor 30. The tube 64 empties into the trough 50. By collecting water slopped from the watering device 26, the drain 58 facilitates removal of animal waste from the module 12.

Figure 7:
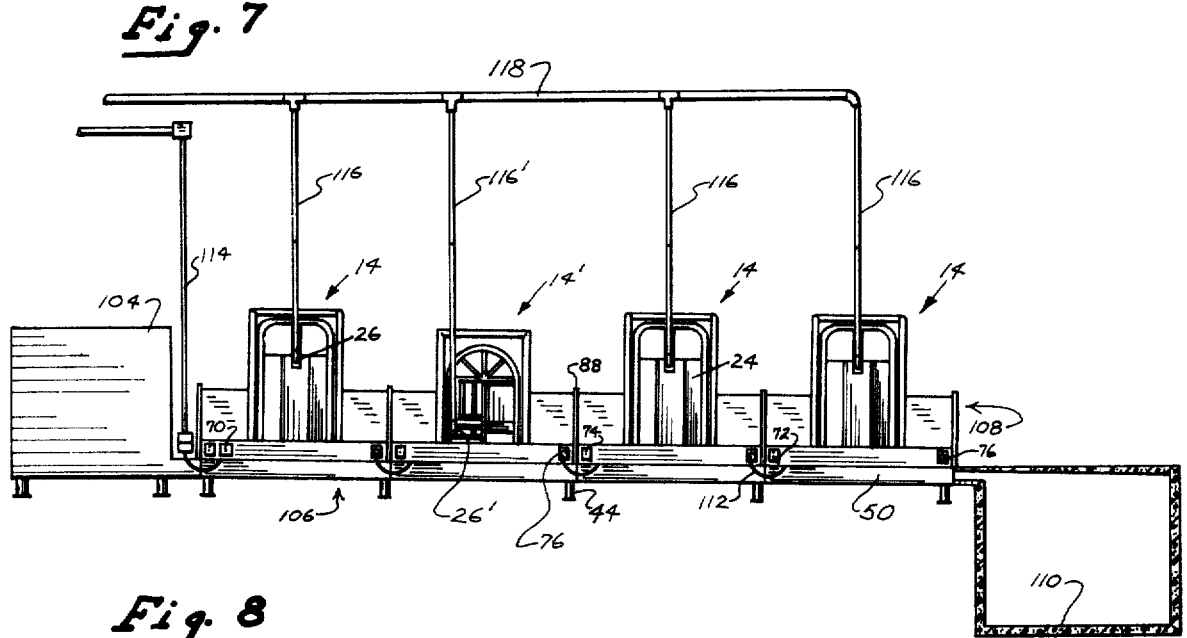
FIG. 7 is a front elevation of several modules interconnected.

FIG. 6 and FIG. 7 show a number of modules 12 interconnected. The flush tank 104 at one end of a row of modules is connected to the first module's 106 trough 50. When it is desired to flush all the troughs 50 at once, water is released from the flush tank 104 into the first module 106. The water then flows from one module's trough 50 to the next since all troughs 50 are interconnected. The last module 108 trough 50 is connected to a pit or lagoon 110; or other waste storage, disposal device or the like.

FIG. 8 also shows the heating coils 68 interconnected by wires 112 from one module's socket 76 to the next module's plug 77. By this arrangement, when the first module next to the power source 114 is electrically connected thereto, each succeeding plug 77 is not charged until it is plugged into the appropriate socket 77. A dangling free plug 77 is therefore never electrically charged. The first module 106 is connected to a power source 114. The water device 26 of each stall 14 is connected by a water pipe 116 to a source 118 of water.

FIG. 8 shows the universality of the modules 12 in that either one commercially available stall 14 can be placed therein, such as an aluminum farrowing stall 14 manufactured by New Age Industrial Corporation of Norton, Kans., or another stall 14', having a watering device 26' connected by line 116' to the water source 118. The stall 14' is manufactured by Hi-Way Manufacturing Company of Roann, Ind. A module 12 has sufficient length and width to receive most commercially available farrowing stalls or crates.

Obviously many modifications and variations of the present invention are possible in light of the above teachings. It is therefore to be understood that, within the scope of the appended claims, the invention may be practiced otherwise than as specifically described.

I claim:
1. A modular base comprising:
a floor serving as a top for said base;
said floor having an opening toward one end thereof extending completely across the width thereof;
manure passing grate means retained by said base for covering said opening;
trough means connected to said base and disposed under said grate means for receiving waste disposed therethrough;
drinking water drain means attached to said base at the end thereof away from said opening, said drain means being connected to a tube running under said floor, with said tube emptying into said trough means;
heating means embedded in said floor and maintaining a desired floor temperature;
said floor having a crown profile formed therein as viewed in side elevation, with said crown formed between said trough means and said drain means, said crown extending laterally throughout the entire width of said floor; and
a plurality of screw jacks attached to said base for tilting said base at a desired slope of said trough means, and wherein said modular base is moveable as a unit and locateable on any flat surface by means of said screw jacks.

* * * * *